United States Patent [19]

Gammel

[11] Patent Number: 5,717,738
[45] Date of Patent: Feb. 10, 1998

[54] METHOD AND DEVICE FOR GENERATING USER DEFINED SPOKEN SPEED DIAL DIRECTORIES

[75] Inventor: Michele B. Gammel, Farmers Branch, Tex.

[73] Assignee: Texas Instruments Incorporated, Dallas, Tex.

[21] Appl. No.: 2,749

[22] Filed: Jan. 11, 1993

[51] Int. Cl.$^6$ ............................................. H04M 1/26
[52] U.S. Cl. ............................. 379/67; 379/88; 379/355; 395/2.79
[58] Field of Search ........................ 379/67, 88, 89, 379/355, 354, 357, 356; 395/2.79

[56] References Cited

U.S. PATENT DOCUMENTS

| | | | |
|---|---|---|---|
| 4,644,107 | 2/1987 | Clowes et al. | 379/354 |
| 4,853,953 | 8/1989 | Fujisaki | 379/355 |
| 4,870,686 | 9/1989 | Gerson et al. | 379/355 |
| 4,928,302 | 5/1990 | Koneuchi et al. | 379/88 |
| 5,054,053 | 10/1991 | Sekonishi et al. | 379/88 |
| 5,127,043 | 6/1992 | Hunt et al. | 379/88 |
| 5,165,095 | 11/1992 | Borcherding | 379/88 |
| 5,204,894 | 4/1993 | Darden | 379/88 |
| 5,222,121 | 6/1993 | Shimada | 379/355 |
| 5,274,695 | 12/1993 | Green | 379/88 |
| 5,297,183 | 3/1994 | Bareis et al. | 379/88 |
| 5,369,685 | 11/1994 | Kero | 379/67 |
| 5,452,397 | 9/1995 | Ittycheriah et al. | 395/2.49 |

FOREIGN PATENT DOCUMENTS

| | | | |
|---|---|---|---|
| 59-205894 | 11/1984 | Japan | 379/355 |
| 59-225656 | 12/1984 | Japan | 379/355 |
| 2-305047 | 12/1990 | Japan | 379/356 |
| 3-208448 | 9/1991 | Japan | 379/356 |
| 4-000951 | 1/1992 | Japan | 379/355 |
| 4-021244 | 1/1992 | Japan | 379/355 |

OTHER PUBLICATIONS

"Application of Isolated Word Recognition to a Voice Controlled Repertory Dialer Sysetm", Rabiner et al., IEEE 1980, pp. 182–185, ICASSP Proceedings.

"Repertory Telephone Dialer Responds to Human Voice", Teja EDN, Oct. 20, 1980, pp. 57, 59.

"Voice Dialer", M. Immerdorfer, Electrical Communication (ITT) vol. 59, No. 3, 6 May 1985 pp. 281–285.

"A Voice Activated Telephone", Miyatake et al., IEEE Transactions on Consumer Electronics, CE–32 (1986) Aug., No. 3, pp. 468–472.

*Primary Examiner*—Krista Zele
*Assistant Examiner*—Scott L. Weaver
*Attorney, Agent, or Firm*—Ronald O. Neerings; James C. Kesterson; Richard L. Donaldson

[57] ABSTRACT

A voice recognition telephone system (10) allows a user to generate a plurality of directories (76). Each directory has a corresponding entry list containing a plurality of entry names and corresponding phone numbers. The user can add (172) or remove (170) entry names as desired. The user can enter phone numbers (192) for each entry name and modify phone numbers as desired. The user can also place a call (158) through a generated entry name.

24 Claims, 15 Drawing Sheets

5,717,738

METHOD AND DEVICE FOR GENERATING USER DEFINED SPOKEN SPEED DIAL DIRECTORIES

TECHNICAL FIELD OF THE INVENTION

This invention relates in general to telephone signal processing systems and more particularly to a method and device for generating user defined spoken speed dial directories.

BACKGROUND OF THE INVENTION

Conventional voice recognition telephone systems use speaker independent voice recognition to access a preprogrammed telephone listing stored within the telephone system. A user of the telephone system is not able to establish a unique directory containing a listing of names and corresponding phone numbers of the user's own choosing. Further, the user cannot create a variety of telephone listings identified by separate directory names. Therefore, it is desirable to have a telephone system that allows a user to generate separate telephone listings, each identified by a separate directory name.

From the foregoing, it may be appreciated that a need has arisen for a method and device for generating user defined spoken speed dial directories. A need has also arisen for a voice recognition telephone system that can store a plurality of directories each having a speed dial telephone list of desired phone numbers. Further, a need has arisen to allow a user to place a call by accessing one of the generated directories.

SUMMARY OF THE INVENTION

In accordance with the present invention, a method and device for generating user defined spoken speed dial directories are provided which substantially eliminate or reduce disadvantages and problems associated with conventional voice recognition telephone systems.

The present invention includes an initial step of detecting an off hook condition on a telephone system. Once an off hook condition is detected, speaker independent command words are recognized to allow a user to enter the system. A user may then open a directory list and enroll user defined directory names to the directory list. The user may also open an entry list corresponding to a directory name and enroll speed dial entry names and phone numbers into the entry list.

The method and device for the present invention provide for various technical advantages. For example, one technical advantage is in providing a method and device for generating user defined spoken speed dial directories. Another technical advantage is in the ability to verbally search and change directory names, entry names, and phone numbers within the telephone system and place calls to desired entry names. Other technical advantages are readily apparent to one skilled in the art from the following descriptions, figures, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
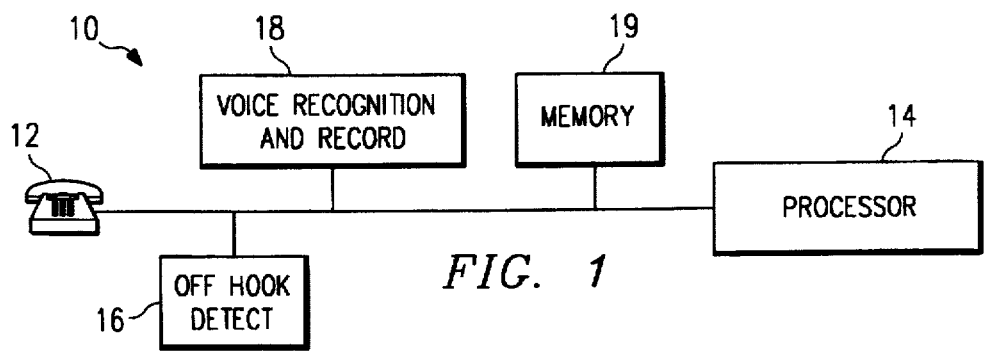
FIG. 1 illustrates a block diagram of a device for generating user defined spoken speed dial directories.

FIG. 1 is a simplified block diagram of a telephone system 10. Telephone system 10 includes a telephone 12 that connects to a processor 14. An off hook detect circuit 16 and a voice recognition and record circuit 18 connect to telephone system 12 and processor 14. A memory 19 also connects to processor 14. In operation, off hook detect circuit 16 informs processor 14 that telephone 12 indicates an off hook condition and allows processor 14 to guide the user of telephone 12 through sequences to access directory and entry lists as programmed within processor 14. Directory and entry lists are stored within memory 19 and voice recognition and record circuit 18 prompts the user of telephone 12 for voice or DTMF commands in order to gain access to directory and entry lists.

Figure 2:
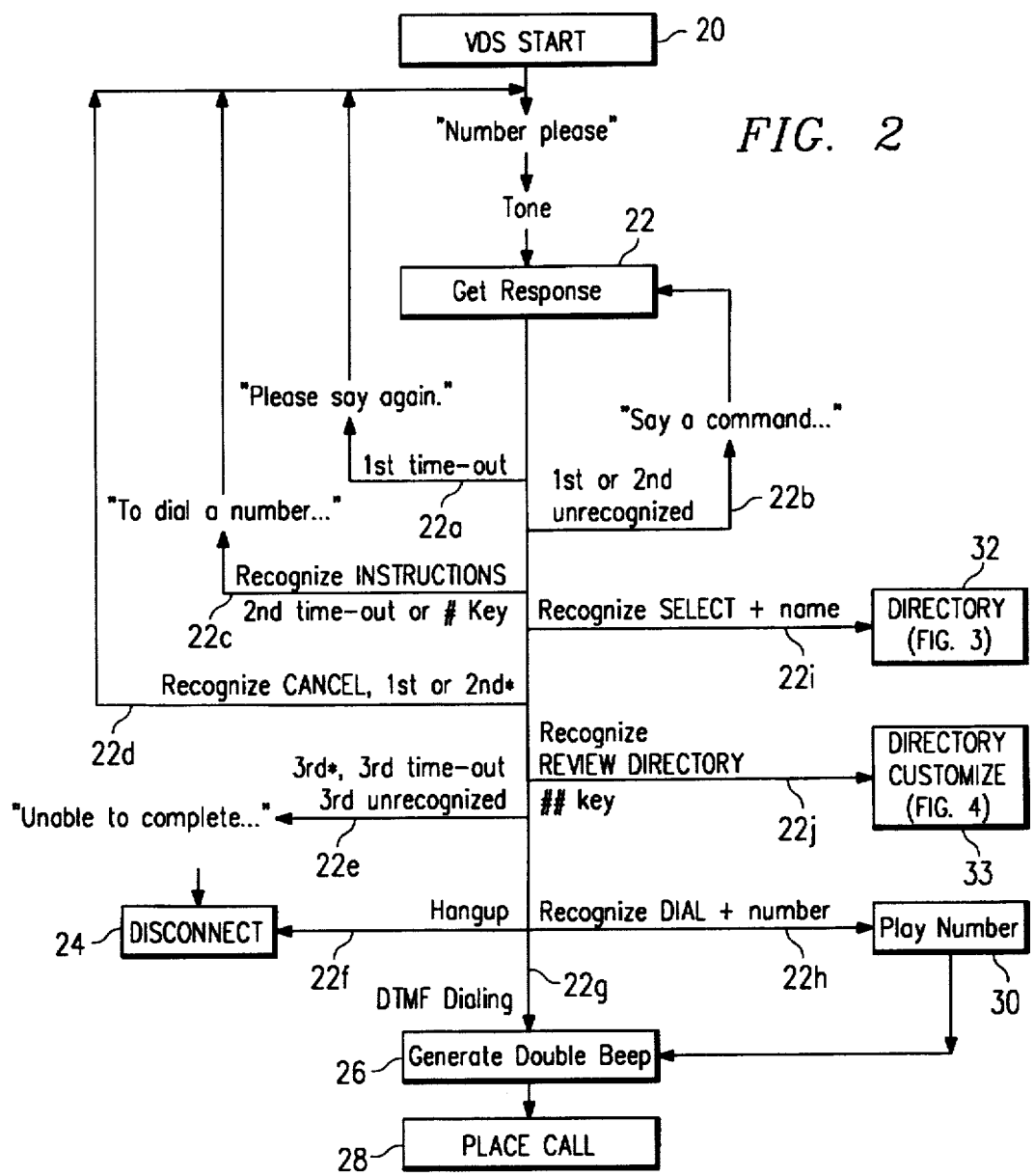
FIG. 2 illustrates a flow diagram of an initial sequence in generating user defined spoken speed dial directories.

FIG. 2 is a flow diagram of the initial steps performed by processor 14 for generating user defined spoken speed dial directories. Process flow begins at step 20 where off hook detect circuit 16 detects if telephone 12 is in use. Upon detecting an off hook condition, processor 14 prompts the user for a command and receives the response at step 22. At step 22, processor 14 analyzes the response received from the user in order to recognize an appropriate command phrase.

Processor 14 is programmed to receive a variety of start responses and proceed according to such start responses. Processor 14 may recognize, after a certain time interval, a no response from the user at step 22a and prompt the user to make an appropriate response.

If the system cannot recognize a first or second response from the user, processor 14 prompts the user to respond with an appropriate command word at step 22b and provides the user with a list of appropriate command words.

If a second no response occurs or the system recognizes an INSTRUCTION command or corresponding DTMF push button code, processor 14 prompts the user at step 22c with instructions on how to proceed through the process.

If processor 14 recognizes a CANCEL command or corresponding DTMF push button code at step 22d, process flow returns to step 20 where the user again receives the prompt for a response.

If the system recognizes a third CANCEL command, a third no response, or a third unrecognized phrase at step 22e, processor 14 then prompts the user that the call cannot be completed and the system will then disconnect at step 24. Process flow will also proceed to step 24 if off hook detect circuit 16 determines that the user has hung up telephone 12 at step 22f.

Processor 14 may also recognize that a call is being placed through the DTMF push buttons of telephone 12 at step 22g, indicating that the telephone number has been received at step 26 and subsequently placing the call at step 28.

Processor 14 may also recognize a DIAL command and verbal telephone number from the user at step 22h and repeat the number for the user at step 30. Process flow will then continue through step 26 indicating that the phone number has been received and subsequently placing the phone call at step 28.

Processor 14 may also recognize a SELECT command and directory name at step 22i, allowing the user to enter a directory option at block 32.

Processor 14 may also recognize a REVIEW DIRECTORY command or corresponding DTMF push button code at step 22j and route the user to a directory customize option at block 33.

Figure 3:
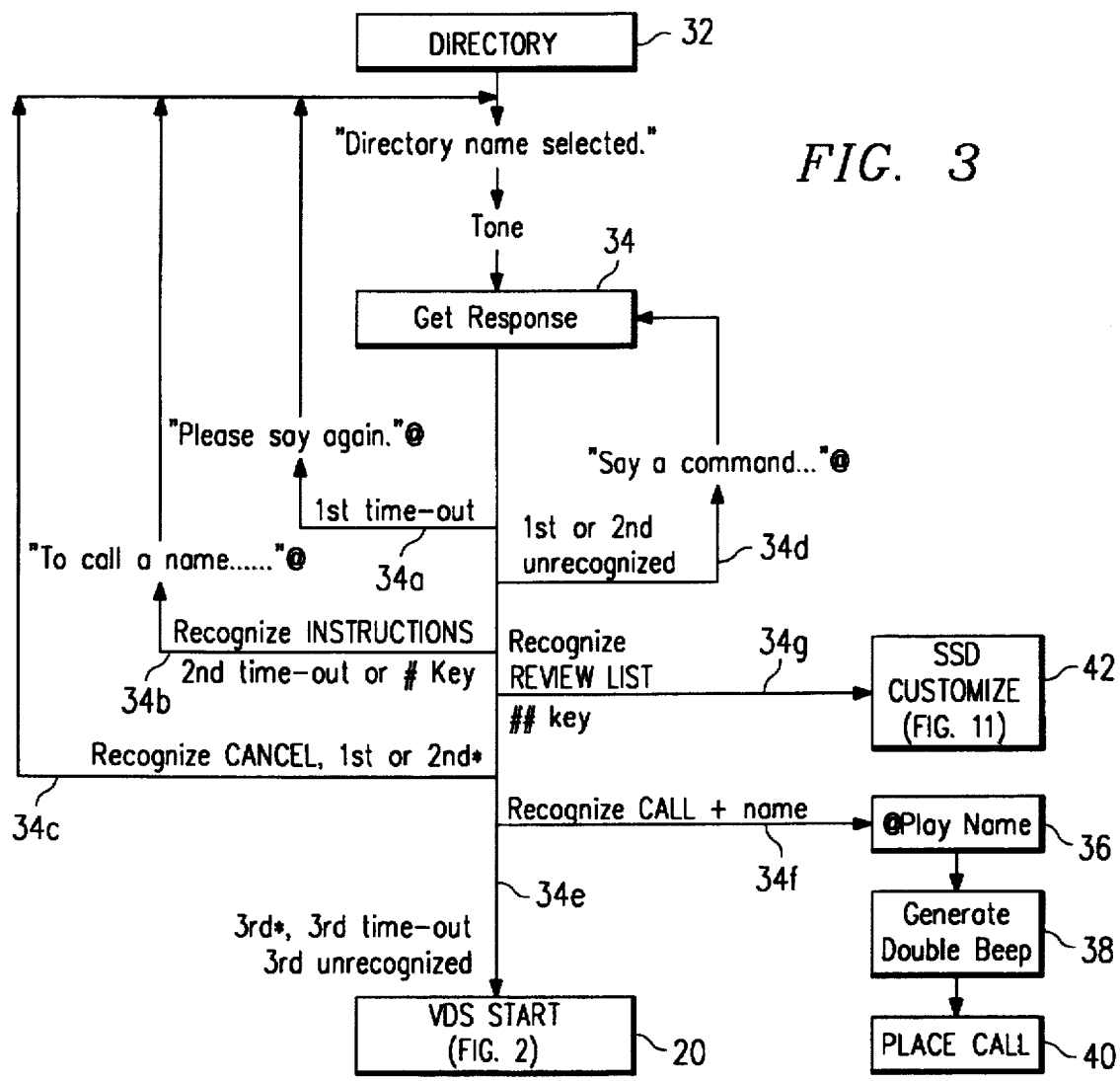
FIG. 3 illustrates a flow diagram for allowing a user to access a directory within the telephone system.

FIG. 3 is a flow diagram of the directory option of block 32. When telephone system 10 recognizes a select command and directory name, processor 14 prompts the user by repeating the directory name selected and awaits a user response at step 34. Processor 14 is programmed to receive a variety of directory responses and proceed according to those directory responses.

If no response is received after a predetermined timed interval, processor 14 will prompt the user at step 34a to provide a response.

If no response is received after a second timed interval or processor 14 recognizes an INSTRUCTION command or corresponding DTMF push button code at step 34b, processor 14 will inform the user of the procedures to follow within the directory option and request the user to provide an appropriate response.

Processor 14 may also recognize a CANCEL command or a corresponding DTMF push button code at step 34c, returning the user to step 32 of the directory option at either the first or second occurrence of the CANCEL command.

If a user's response is not recognized by processor 14, processor 14 will prompt the user at step 34d with the commands authorized for the directory option.

Processor 14 returns process flow to step 20 of FIG. 2 whenever a third no response, a third unrecognized response, or a third CANCEL command occurs at step 34e.

At step 34f, processor 14 may recognize a CALL command and entry name within an entry list of the directory name selected when the user entered the directory option. When recognized, process flow proceeds to step 36 where processor 14 plays the requested name and informs the user at step 38 that a call is being placed. Telephone system 10 automatically dials a phone number corresponding to the requested name within the selected directory at step 40.

Processor 14 may also recognize a REVIEW LIST command or corresponding DTMF push button code at step 34g and allow the user to enter the entry list containing entry names and phone numbers corresponding to the selected directory name through the speed dial customize option at block 42.

Returning to FIG. 1, processor 14 may recognize a REVIEW DIRECTORY command or corresponding DTMF push button code at step 22j and allow the user to enter the directory customize option at block 33.

Figure 4:
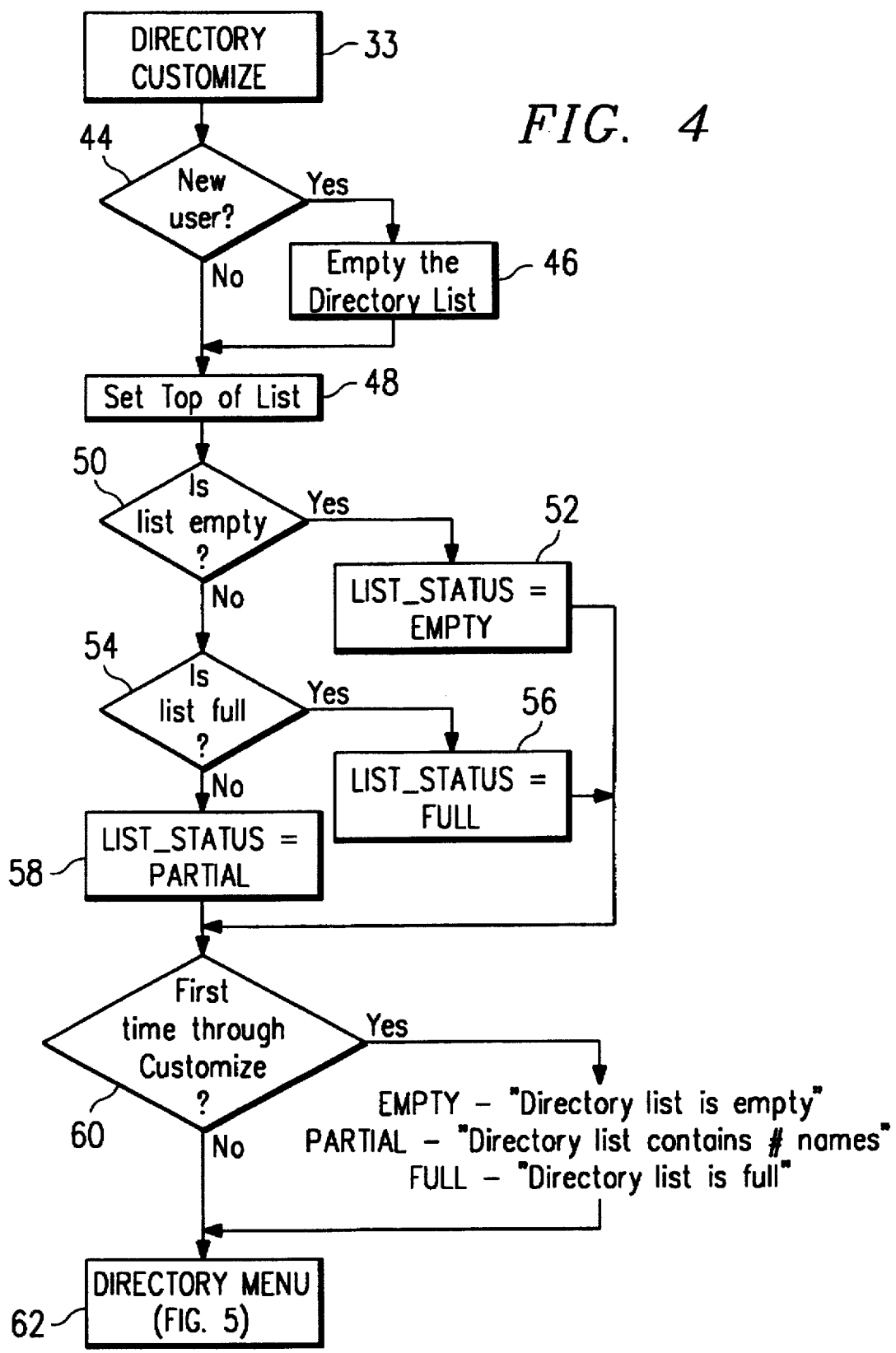
FIG. 4 illustrates a flow diagram for allowing the user to access a directory list.

FIG. 4 is a flow diagram of the directory customize option of block 33. The directory customize option begins at decision block 44 where processor 14 determines if the user is new to telephone system 10. If so, processor 14 empties the directory list at step 46 and proceeds to step 48 where a pointer is set to the first directory name in the directory list. Process flow continues to decision block 50 where processor 14 determines if the directory list is empty. For a new user, the directory list will be empty and this status will be indicated at step 52. If the directory list is not empty, process flow proceeds to decision block 54 to determine if the directory list is full. If so, a flag is set at step 56 to indicate the full status of the directory list. If the list is not full, a flag is set at block 58 to indicate that the directory list is partially full. Once the status of the directory list is determined, process flow proceeds to decision block 60 where processor 14 determines whether this is the user's first time through the directory customize option. If so, the user receives a prompt indicating the status of the directory list as either empty, partial, or full. Process flow proceeds to block 62 to allow the user to enter the directory menu option.

Figure 5:
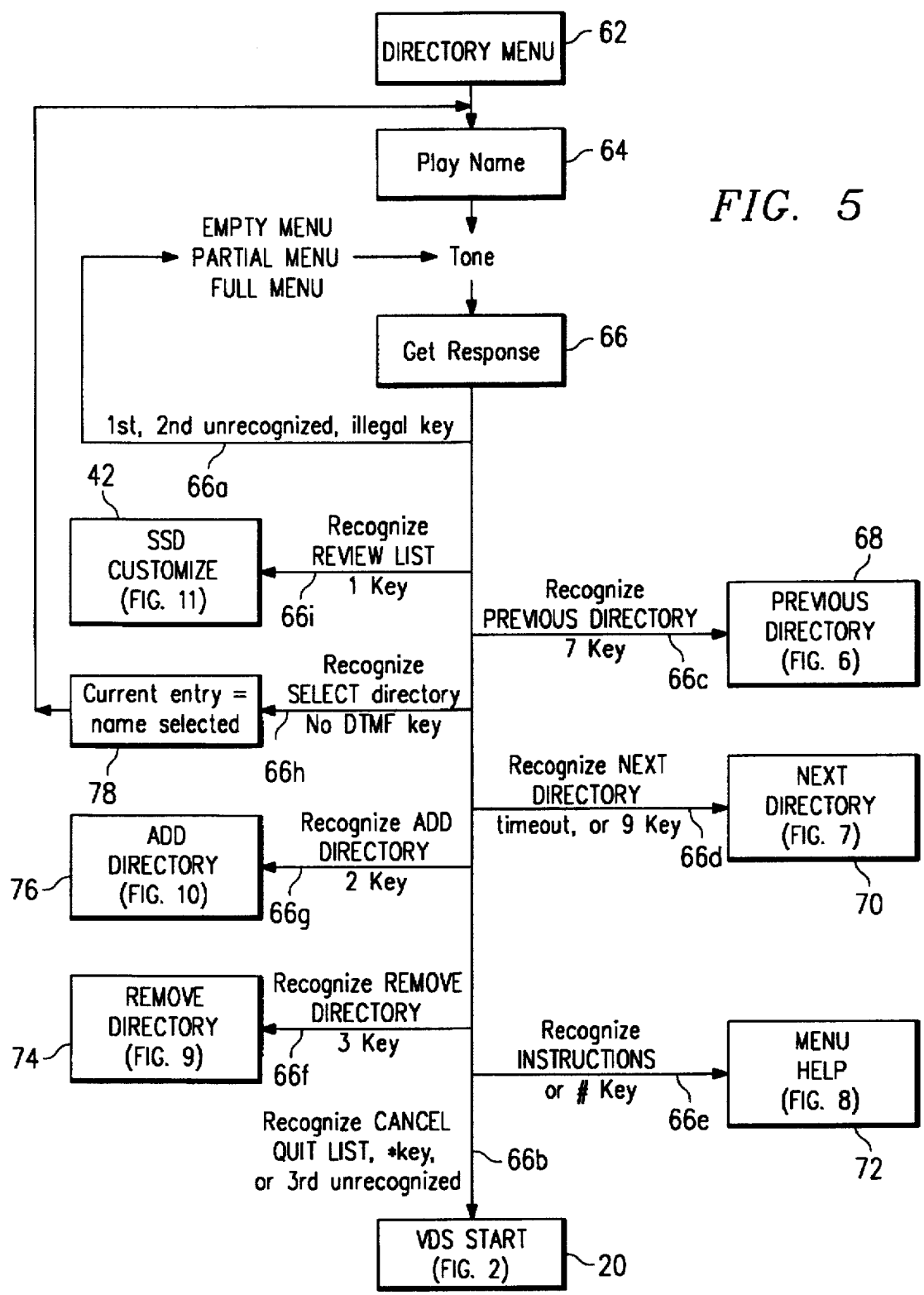
FIG. 5 illustrates a flow diagram for allowing the user to review and modify a directory list.

FIG. 5 is a flow diagram of the directory menu option of block 62. Upon entering the directory menu option, processor 14 plays the directory name at step 64 flagged by the pointer and awaits for a response at step 66. Processor 14 may receive a variety of directory menu responses and proceed based on the specific directory menu response received from the user.

If processor 14 does not recognize a response or receives an illegal key at step 66a, processor 14 will prompt the user to provide an appropriate response.

If processor 14 recognizes a CANCEL command or corresponding DTMF push button code or receives a third unrecognizable response at step 66b, process flow returns to the process beginning at step 20 of FIG. 1 and the process must begin anew.

Processor 14 may recognize a PREVIOUS DIRECTORY command or corresponding DTMF push button code at step 66c and route the user to a previous directory block 68.

Processor 14 may recognize a NEXT DIRECTORY command or corresponding DTMF push button code at step 66d and route the user to a next directory block 70. If no response is received from the user, processor 14 also routes the user to next directory block 70.

Processor 14 may recognize an INSTRUCTIONS command or corresponding DTMF push button code at step 66e and route the user to menu help block 72.

Processor 14 may recognize a REMOVE DIRECTORY command or corresponding DTMF push button code at step 66f and route the user to remove directory block 74.

Processor 14 may recognize an ADD DIRECTORY command or corresponding DTMF push button code at step 66g and route the user to add directory block 76.

Processor 14 may recognize a SELECT DIRECTORY command at step 66h and set the pointer to a directory name selected and return process flow to step 64 to play the name and await for a response at step 66.

Processor 14 may recognize a REVIEW LIST command or corresponding DTMF push button code at step 66i and route the user to the speed dial customize option at block 80 to allow the user access to the entry list corresponding to the selected directory name.

Figure 6:
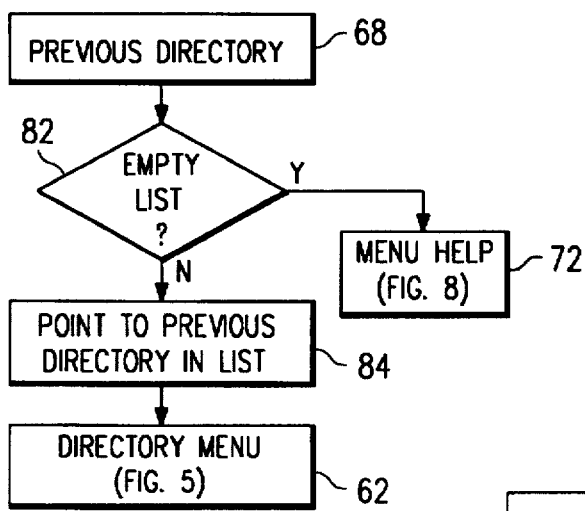
FIG. 6 illustrates a flow diagram for allowing the user to return to a previous directory name in a directory list.

When processor 14 recognizes a PREVIOUS DIRECTORY command or corresponding DTMF push button code, process flow proceeds to previous directory block 68. FIG. 6 is a flow diagram of the process flow for previous directory block 68. At decision block 82, processor 14 determines if there are any directory names in the directory list. If no directory names exist, process flow proceeds to menu help block 72. If the directory list is not empty, process flow proceeds to step 84 where the pointer flags the previous directory name in the directory list. Process flow returns to the directory menu option at block 62 of FIG. 5, returning process flow to the directory menu option with the pointer now identifying the previous directory name in the directory list.

Figure 7:
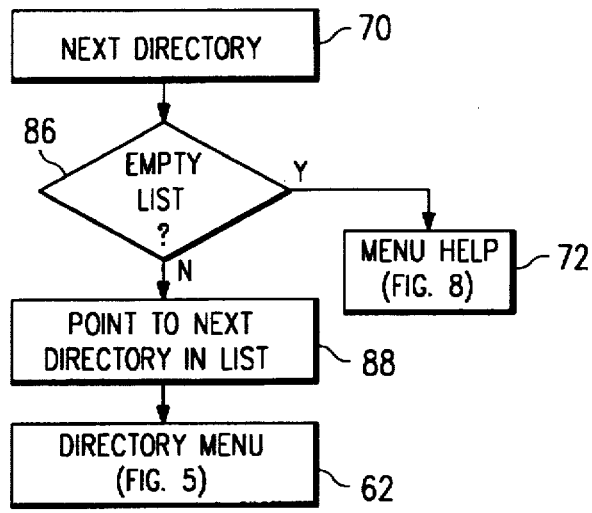
FIG. 7 illustrates a flow diagram for allowing the user to advance to the next directory name in a directory list.

When processor 14 recognizes a NEXT DIRECTORY command or corresponding DTMF push button code or if no response is received from the user at step 66d, process flow enters next directory block 70. FIG. 7 is a flow diagram of next directory block 70. Similarly to previous directory block 68 of FIG. 6, next directory block 70 determines if the directory list is empty at decision block 86. If so, then process flow proceeds to menu help block 72. If the directory list is not empty, process flow continues to step 88 where the pointer flags the next directory name in the directory list. Process flow then returns to the directory menu option at block 62 of FIG. 5 described above with the pointer now identifying the next directory name in the directory list.

Figure 8:
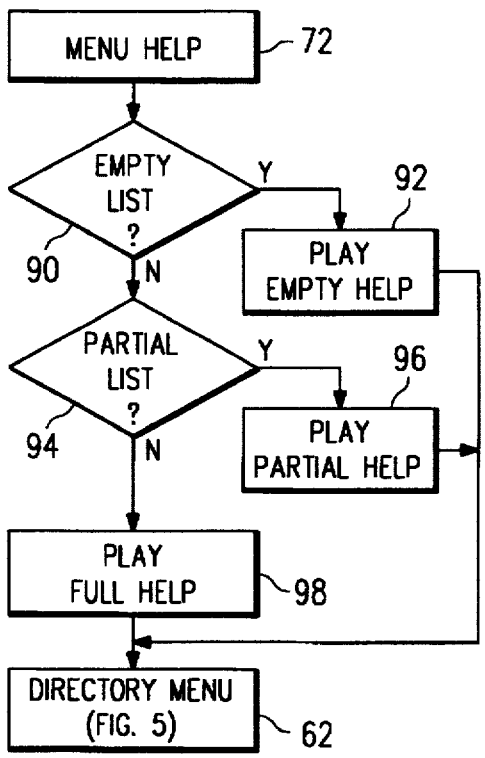
FIG. 8 illustrates a flow diagram for allowing the user to receive help instructions.

When processor 14 recognizes an INSTRUCTIONS command or corresponding DTMF push button code at step 66e of FIG. 5 or upon detecting an empty list in next directory option block 70 of FIG. 6 or previous directory option block 68 of FIG. 7, process flow proceeds to menu help option block 72. FIG. 8 is a flow diagram of menu help block 72. The directory list is checked to see if it is empty at decision block 90. If the directory list is empty, a message is played for the user at step 92 to inform the user that the directory list is empty and to provide the user with instructions on how to proceed. If the directory list is not empty, process flow proceeds to decision block 94 where a determination is made as to whether the directory list is partially full. If the directory list is only partially full, a message is played for the user at step 96 to inform the user of the partial status of the directory list and to provide instructions on how to proceed through the process flow. If the directory list indicates a full status, a message is played informing the user at step 98 that the directory list is full and providing instructions on how to continue through the process flow. After one of the three messages is played, process flow returns to the directory menu option at block 62 of FIG. 5 as described above.

Figure 9:
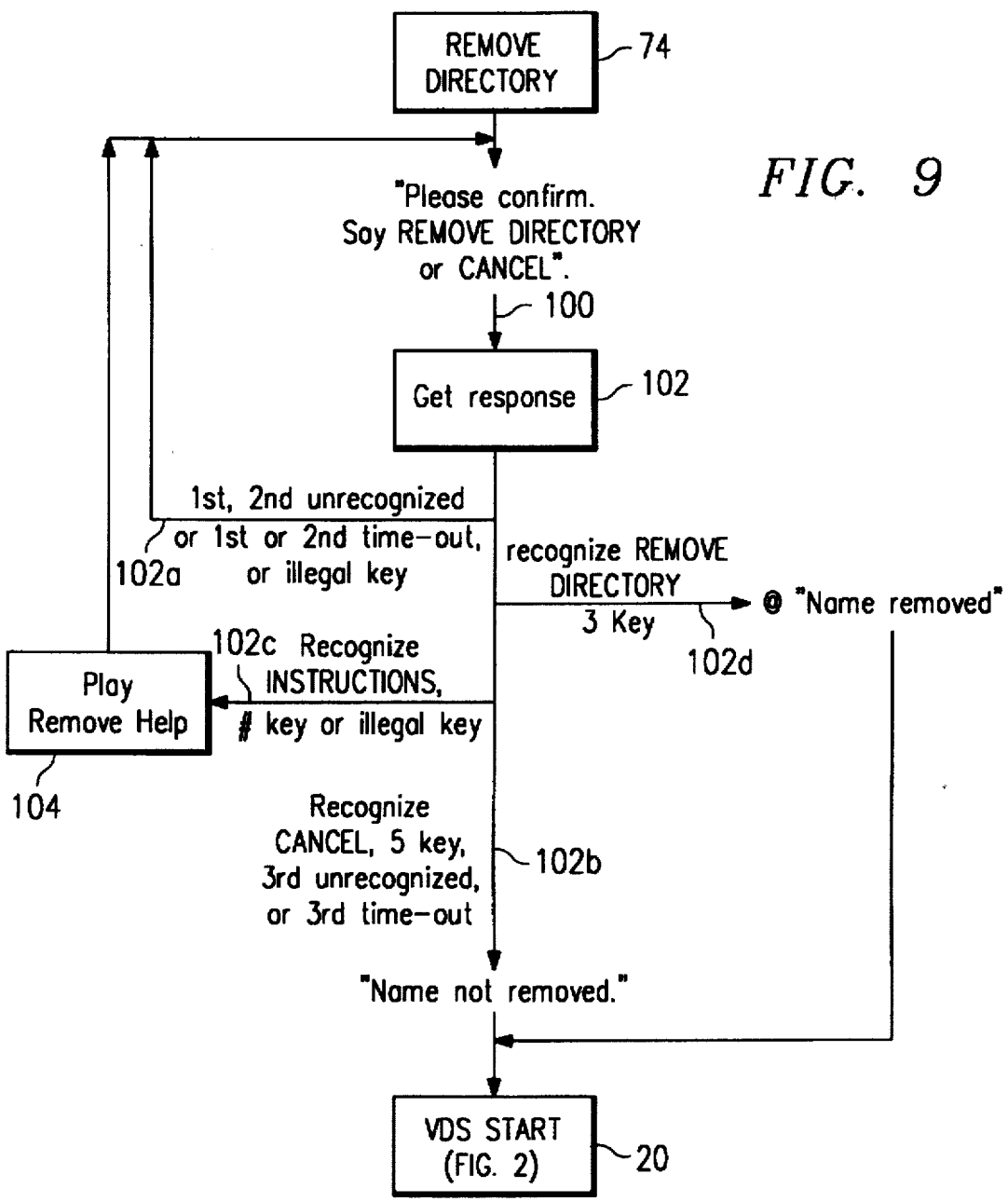
FIG. 9 illustrates a flow diagram for allowing the user to remove a directory name from the directory list.

When processor 14 recognizes a REMOVE DIRECTORY command or corresponding DTMF push button code at step 66f of FIG. 5, process flow enters remove directory block 74. FIG. 9 is a flow diagram of remove directory block 74. At step 100, processor 14 will request the user to confirm the desire to remove a directory name. Processor 14 may receive a variety of remove responses at step 102.

If processor 14 does not recognize a response, does not receive a response, or receives an illegal push button code at step 102a, process flow returns to step 100 where the user is prompted to provide a proper response.

If processor 14 recognizes a CANCEL command or corresponding DTMF push button code or a third unrecognized response or a third no response is received, at step 102b, the user is informed that the name is not removed and process flow returns to step 20 of FIG. 2.

If processor 14 recognizes an INSTRUCTIONS command or corresponding DTMF code, or an illegal key entry at step 102c, the user receives a message at step 104 informing the user of the proper responses to remove a directory name from the directory list. Process flow will then return to step 100, requesting the user to provide a proper response.

If processor 14 recognizes a REMOVE DIRECTORY command or corresponding DTMF push button code at step 102d, the user is informed of the directory name removed and process flow returns to step 20 of FIG. 1.

Figure 10:
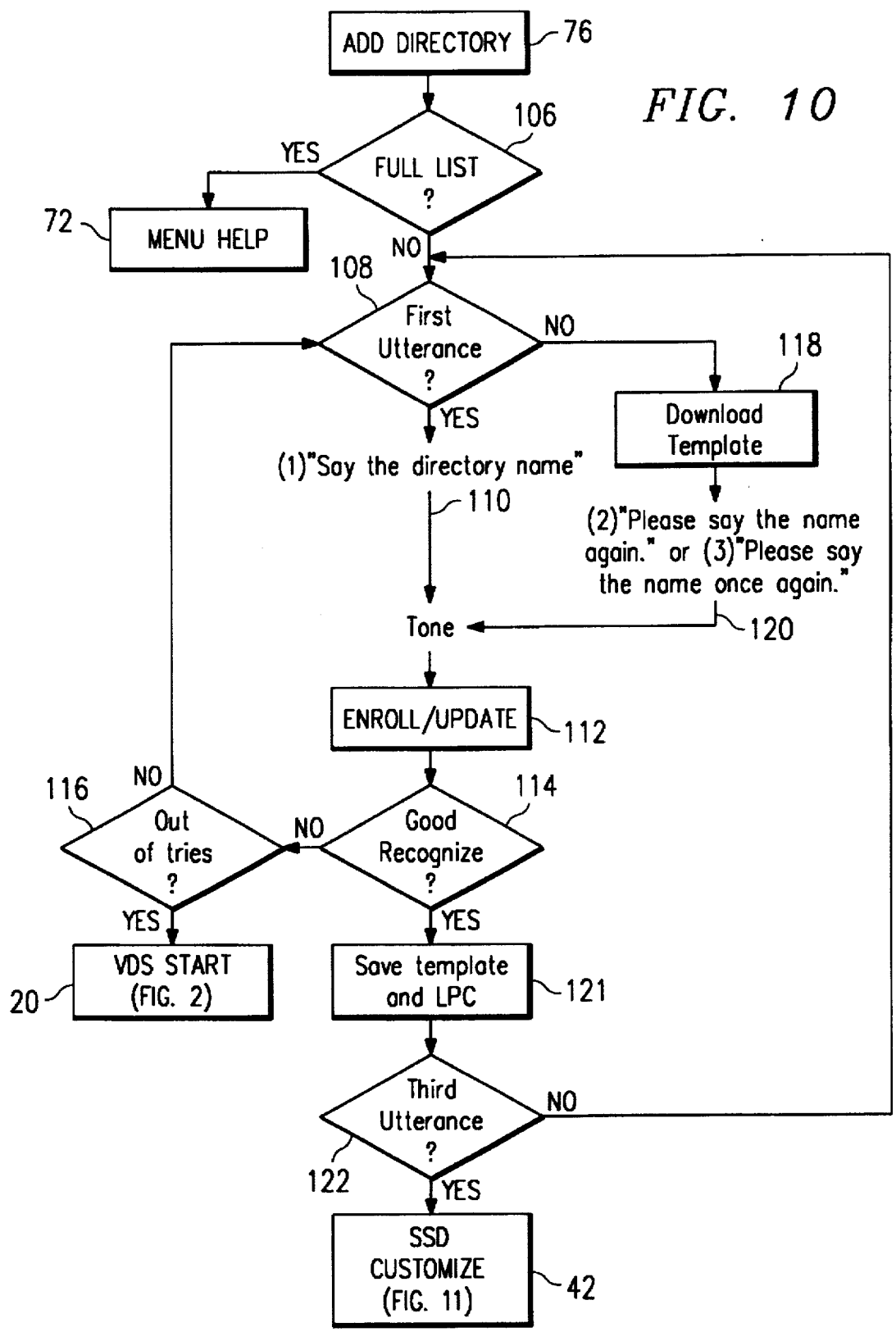
FIG. 10 illustrates a flow diagram for allowing the user to add a directory name to a directory list.

When processor 14 recognizes an ADD DIRECTORY command or corresponding DTMF push button code at step 66g of FIG. 5, process flow enters add directory block 76. FIG. 10 is a flow diagram of add directory block 76. At decision block 106, a determination is made as to whether the directory list is full. If so, process flow proceeds to menu help block 72 as previously described. If the directory list is not full, process flow proceeds to decision block 108 where a determination is made as to whether this is the user's first utterance. The process for enrolling a directory name requires the user to provide three good recognizable utterances of the desired directory name. If decision block 108 determines that this is the first utterance, processor 14 requests the user to say the directory name at step 110. The spoken directory name is received and enrolled at step 112 and decision block 114 determines whether a good recognition exists on the received directory name.

Since a good recognition will not occur on the first utterance, process flow proceeds to step 116 to see if too many attempts have been made to enroll a directory name. Since only one attempt has been made thus far, process flow returns to decision block 108. Since a second utterance is now desired, process flow proceeds to step 118 where the first utterance template is down loaded and then to step 120 where the user is prompted to repeat the directory name. The second utterance of the directory name is enrolled at step 112 and compared to the first utterance at step 14 to determine a good recognition match.

If there is not a good recognition, process flow proceeds to step 116 and step 108 as previously described above. If a good recognition match occurs at decision block 114, process flow proceeds to block 120 where the template corresponding to the directory name is saved. If decision block 122 determines that this is not the third utterance, process flow returns to step 108 to request a third utterance and confirmation of the directory name. If decision block 122 determines that this is the third utterance, process flow proceeds to the speed dial customize option at block 42 to allow the user to enroll entry names and phone numbers into the newly created directory name. If a good recognition match does not occur at step 116 after three attempts, process flow returns to step 20 of FIG. 2.

Figure 11:
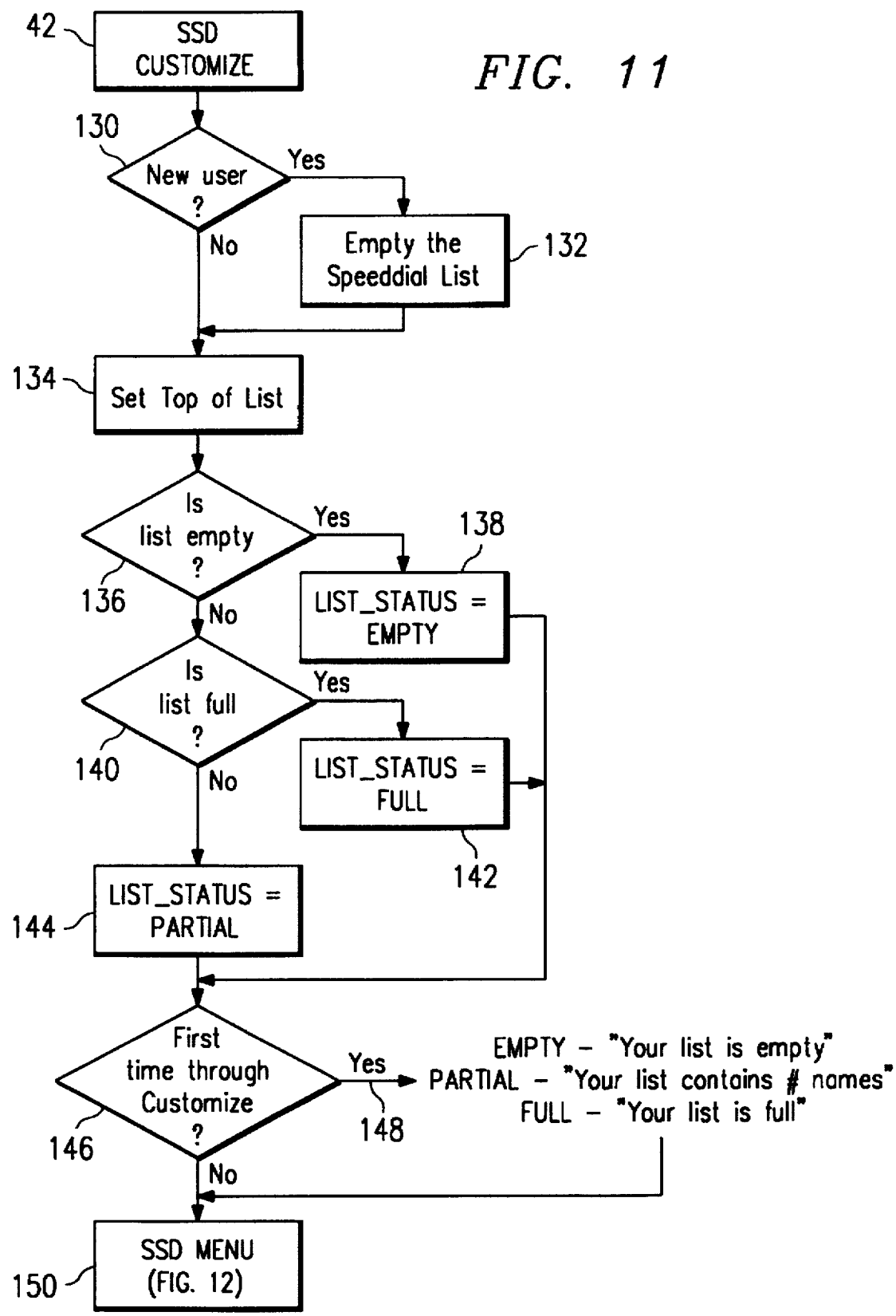
FIG. 11 illustrates a flow diagram for allowing the user to access an entry list within a directory name.

The speed dial customize option may be entered at step 34f of FIG. 3, step 66i of FIG. 5, or after receiving a third utterance at step 122 of FIG. 10. FIG. 11 is a flow diagram of the speed dial customize option beginning at block 42. The speed dial customize option works similarly to the directory customize option by allowing user access to entry lists containing entry names and phone numbers corresponding to a particular directory name.

Decision block 130 determines whether the user is new to telephone system 10. If so, process flow proceeds to step 132 where the speed dial list is emptied. After the speed dial list is emptied, or if the user is not new to the system, process flow proceeds to step 134 where a pointer is set to the first entry name in the entry list. Decision block 136 determines if the list is empty and proceeds to indicate such status by setting a flag at step 138. If the list is not empty, decision block 140 determines if the list is full and indicates such status by setting a flag at step 142. If the entry list is not empty or full, a flag is set at step 144 indicating that the entry list is partially full.

After one of the three flags is set, process flow proceeds to decision block 146 to determine if this is the user's first time through the speed dial customize option. If so, then the user is informed of the status of the entry list for the corresponding directory name. After the user is informed of the entry list status, or if this is not the first time through the customize option, process flow proceeds to step 150 to allow the user to enter a speed dial menu option of block 150.

Figure 12:
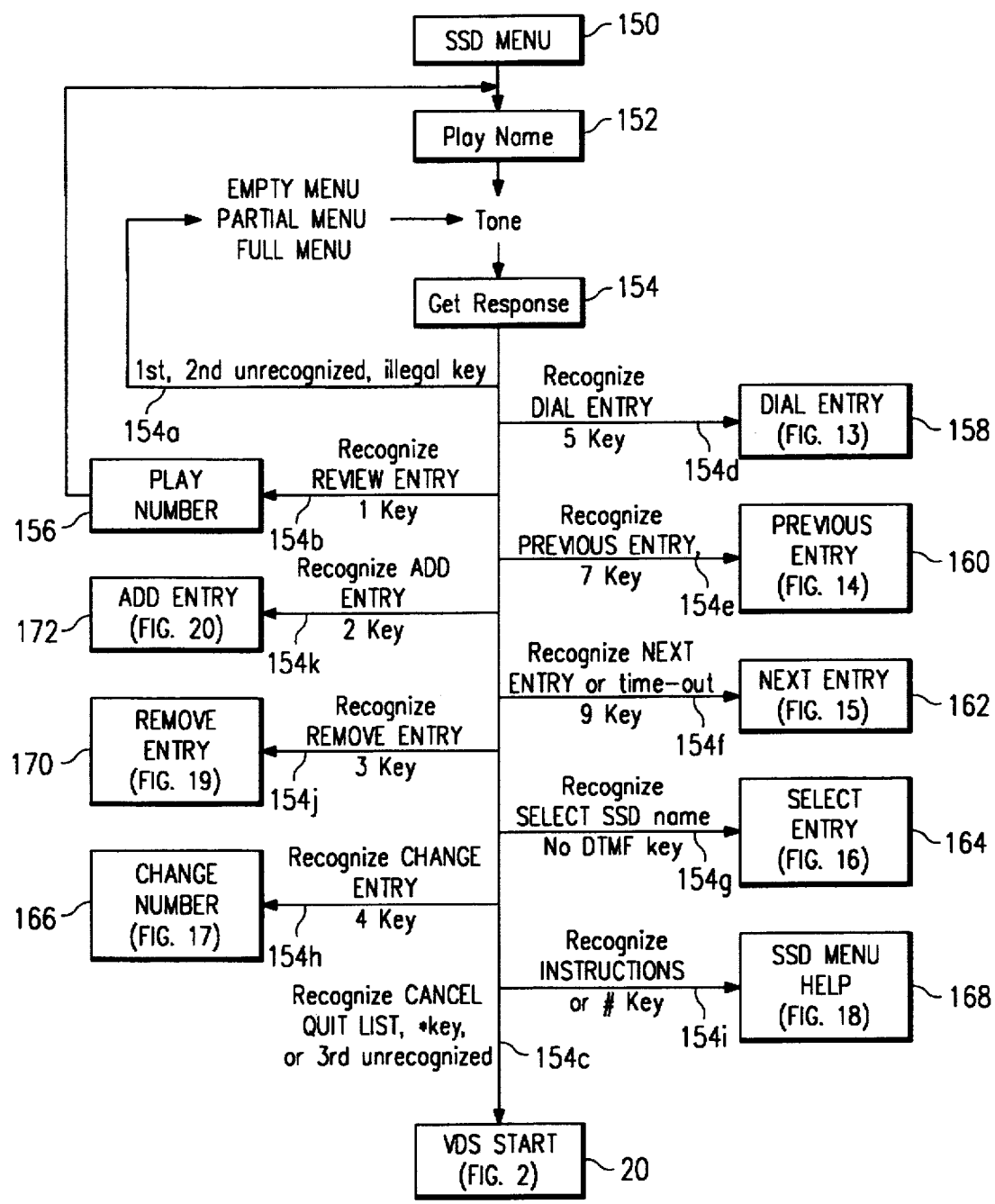
FIG. 12 illustrates a flow diagram for allowing the user to review and modify an entry list.

FIG. 12 is a flow diagram of the speed dial menu option of block 150. Processor 14 plays the entry name at which the pointer is set at step 152 and awaits a response from the user at step 154. Processor 14 may receive a variety of speed dial responses and proceed according to the specific response received.

Processor 14 may receive an unrecognized command or illegal key at step 154a and subsequently prompt the user to provide an appropriate response.

Processor 14 may recognize a REVIEW ENTRY command or corresponding DTMF push button code at step 154b and play the phone number at step 156 corresponding to the entry name played at step 152. Process flow then returns to step 154 to await another response.

Processor 14 may also recognize a CANCEL command or corresponding DTMF code or receive a third unrecognized command at step 154c and return process flow to step 20 of FIG. 2.

Processor 14 may recognize a DIAL ENTRY command or corresponding DTMF push button code at step 154d, allowing the user to enter a dial entry block 158. Processor 14 may recognize a PREVIOUS ENTRY command or corresponding DTMF push button code at step 154e, allowing the user to enter a previous entry block 160.

Processor 14 may recognize a NEXT ENTRY command or corresponding DTMF push button code at step 154f, allowing the user to enter a next entry block 162. Processor 14 will also proceed to the next entry block 162 if no response is received from the user.

Processor 14 may recognize a SELECT SPEED DIAL command and entry name at step 154g, allowing the user to enter a select entry block 164.

Processor 14 may recognize a CHANGE ENTRY command or corresponding DTMF code at step 154h, allowing the user to enter a change number block 166.

Processor 14 may recognize an INSTRUCTIONS command or corresponding DTMF push button code at step 154i, allowing the user to enter a speed dial menu help block 168.

Processor 14 may recognize a REMOVE ENTRY command or corresponding DTMF push button code at step 154j, allowing the user to enter a remove entry block 170.

Processor 14 may recognize an ADD ENTRY command or corresponding DTMF push button code at step 154k, allowing the user to enter an add entry block 172.

Figure 13:
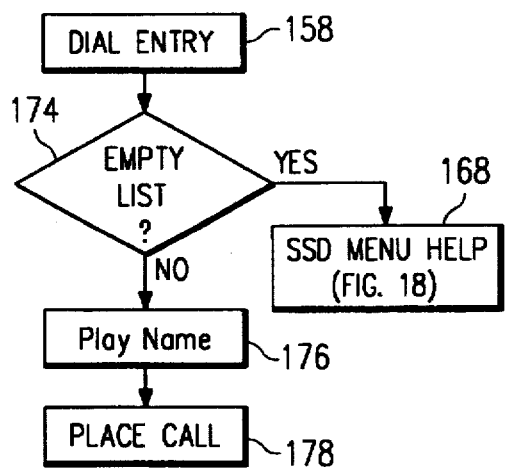
FIG. 13 illustrates a flow diagram for allowing the user to place a call corresponding to an entry name in an entry list.

When processor 14 recognizes a DIAL ENTRY command or corresponding DTMF push button code at step 154d of FIG. 12, process flow proceeds to dial entry block 158. FIG. 13 is a flow diagram of dial entry block 158. Upon entering dial entry block 158, decision block 174 determines if the entry list is empty. If so, then process flow proceeds to speed dial menu help block 168. If the entry list is not empty, processor 14 will play the name at step 176 identified by the pointer and place the call corresponding to that name at step 178.

Figure 14:
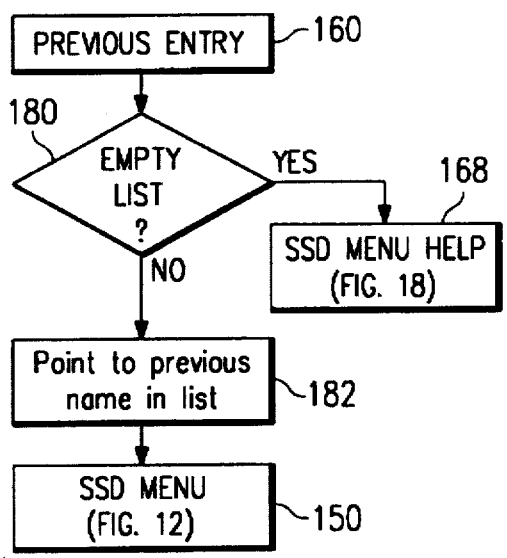
FIG. 14 illustrates a flow diagram for allowing the user to return to a previous entry name in the entry list.

When processor 14 recognizes a PREVIOUS ENTRY command or corresponding DTMF push button code at step 154e of FIG. 12, process flow proceeds to previous entry block 160. FIG. 14 is a flow diagram of previous entry block 160. Upon entering previous entry block 160, decision block 180 determines if the entry list is empty. If so, then process flow proceeds to speed dial menu help block 168. If the entry list is not empty, the pointer is reset to point to the previous entry name in the entry list at step 182. Process flow then returns to the speed dial menu option at block 150 of FIG. 12.

Figure 15:
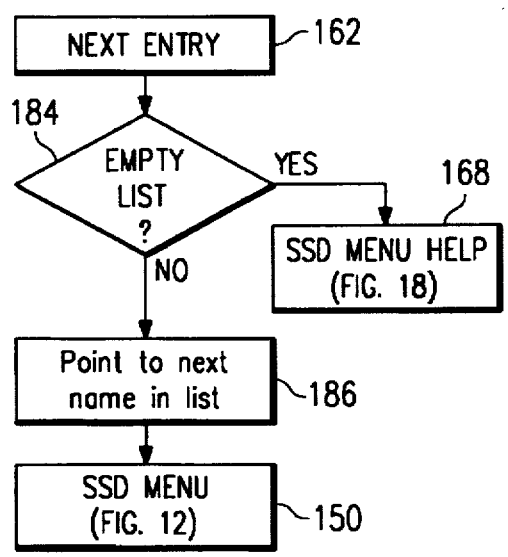
FIG. 15 illustrates a flow diagram for allowing the user to continue to the next entry name in the entry list.

When processor 14 recognizes a NEXT ENTRY command or corresponding DTMF push button code or if no response is received from the user, at step 154f, of FIG. 12, process flow proceeds to next entry block 162. FIG. 15 is a flow diagram of next entry block 162. Upon entering next entry block 162, decision block 184 determines if the entry list is empty. If so, process flow proceeds to speed dial menu help block 168. If the entry list is not empty, the pointer is reset to point to the next entry name in the entry list at step 186. Process flow then returns to the speed dial menu option at block 150 of FIG. 12.

Figure 16:
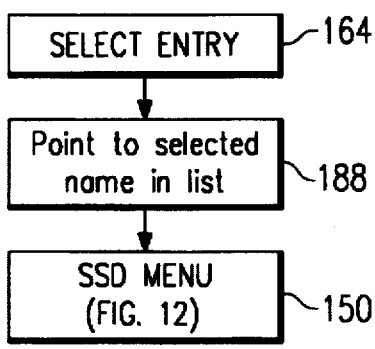
FIG. 16 illustrates a flow diagram for allowing the user to select an entry name from the entry list.

When processor 14 recognizes a SELECT command and entry name at step 154g of FIG. 12, process flow proceeds to select entry block 164. FIG. 16 is a flow diagram of select entry block 164. Upon entering select entry block 164, the pointer is reset to point to the selected entry name in the entry list received from the user at step 188. Process flow then returns to the speed dial menu option at block 150 of FIG. 12.

Figure 17:
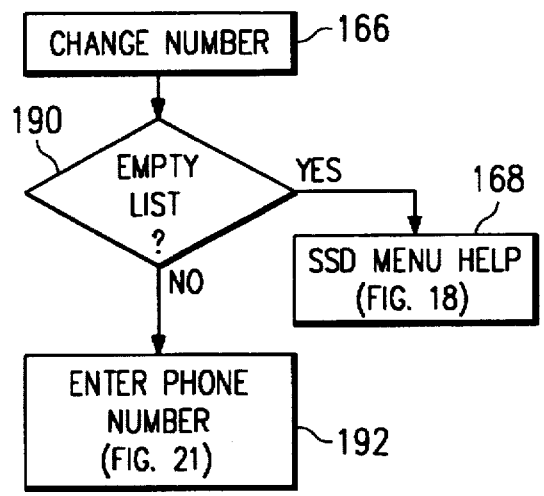
FIG. 17 illustrates a flow diagram for allowing the user to change a phone number corresponding to an entry name in the entry list.

When processor 14 recognizes a CHANGE ENTRY command or corresponding DTMF push button code at step 154h of FIG. 12, process flow proceeds to change number block 166. FIG. 17 is a flow diagram of change number block 166. Upon entering change number block 166, decision block 190 determines if the entry list is empty. If so, then process flow proceeds to speed dial menu help block 168. If the entry list is not empty, processor 14 will enter an enter phone number block 192 to allow the user to change the phone number corresponding to the entry name currently in use as determined by the pointer.

Figure 18:
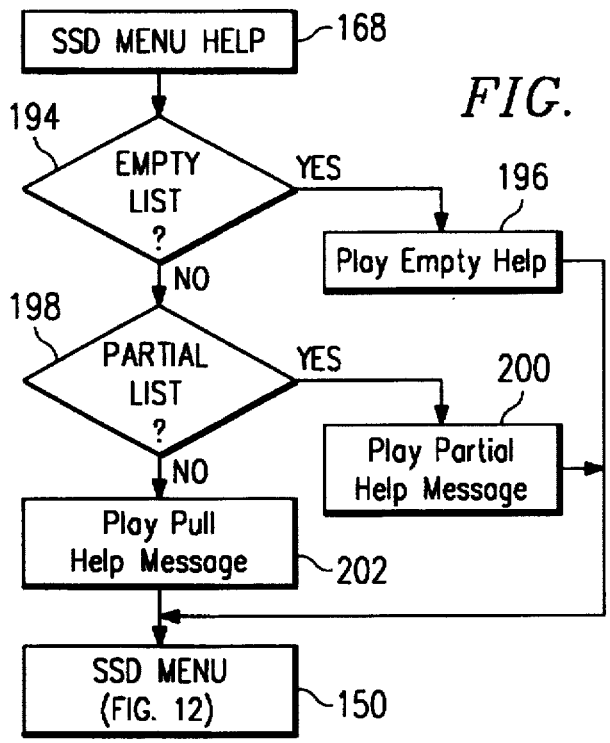
FIG. 18 illustrates a flow diagram for allowing the user to receive help instructions.

When processor 14 recognizes an INSTRUCTIONS command or corresponding DTMF push button code at step 154i of FIG. 12, process flow proceeds to speed dial menu help block 168. FIG. 18 is a flow diagram of speed dial menu help block 168. Upon entering speed dial menu help block 168, decision block 194 determines if the entry list is empty. If so, the user is informed that the entry list is empty at block 196 and given instructions on how to proceed through the speed dial menu option. If the entry list is not empty, decision block 198 determines if the entry list is partially full. If so, the user is informed that the list is partially full at step 200 and given instructions on how to proceed through the speed dial menu option. If the entry list is not empty or partially full, the user is informed that the entry list is full for that entry name and provides instructions on how to proceed through the speed dial menu option. After one of the three messages is played, process flow returns to the speed dial menu option at block 150 of FIG. 12.

Figure 19:
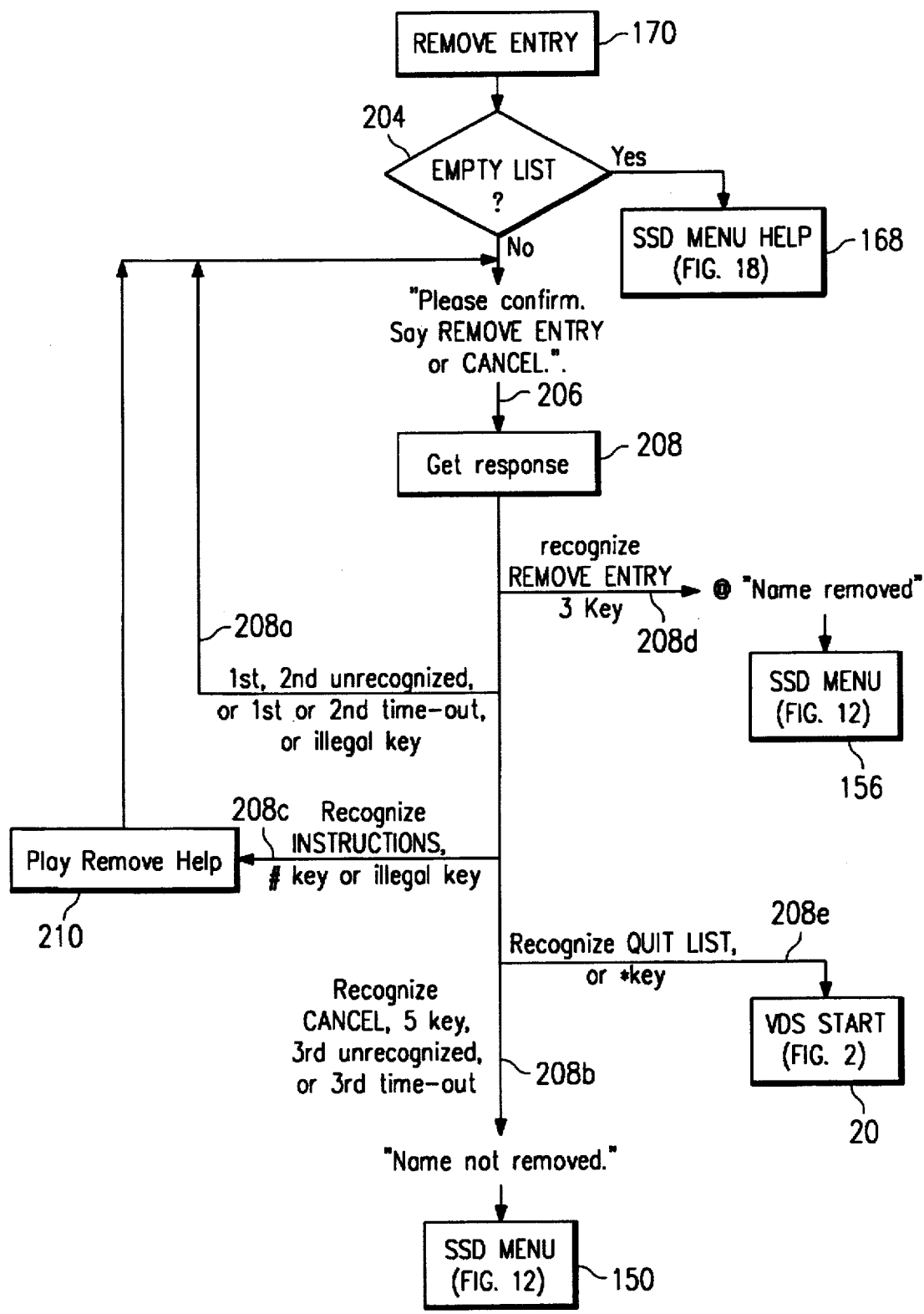
FIG. 19 illustrates a flow diagram for allowing the user to remove an entry name from an entry list.

When processor 14 recognizes a REMOVE ENTRY command or corresponding DTMF push button code at step 154j of FIG. 12, process flow enters remove entry block 170. FIG. 19 is a flow diagram of remove entry block 170. Upon entering remove entry block 170, decision block 204 checks to see if the entry list is empty. If so, process flow proceeds to speed dial menu help block 168 as described above with reference to FIG. 18. If the entry list is not empty, processor 14 requests the user to confirm the remove entry command at step 206 and awaits for a response at step 208. Processor 14 may receive a variety of remove list responses and proceed according to the received remove list response.

If processor 14 does not recognize a response or does not receive a response at step 208a, process flow returns to step 206 requesting the user to provide an appropriate response.

If processor 14 recognizes a CANCEL command or corresponding DTMF push button code or receives a third unrecognized response or a third no response, at step 208b, the user is notified that the entry name will not be removed and process flow returns to the speed dial menu option of block 150 of FIG. 12.

Processor 14 may recognize an INSTRUCTIONS command or corresponding DTMF push button code or an illegal push button key at step 208c and play a message at step 210 informing the user how to proceed through the remove entry option, returning process flow to step 206 to request a response from the user.

Processor 14 may recognize a REMOVE ENTRY command or corresponding DTMF push button code at step 208d, indicating that the user has confirmed removal of the selected entry and informing the user of the entry name removed and returning process flow to the speed dial menu option at block 150 of FIG. 12.

Processor 14 may recognize a quit list command or corresponding DTMF push button code at step 208e, returning process flow to the beginning of the process at block 20 of FIG. 2.

Figure 20:
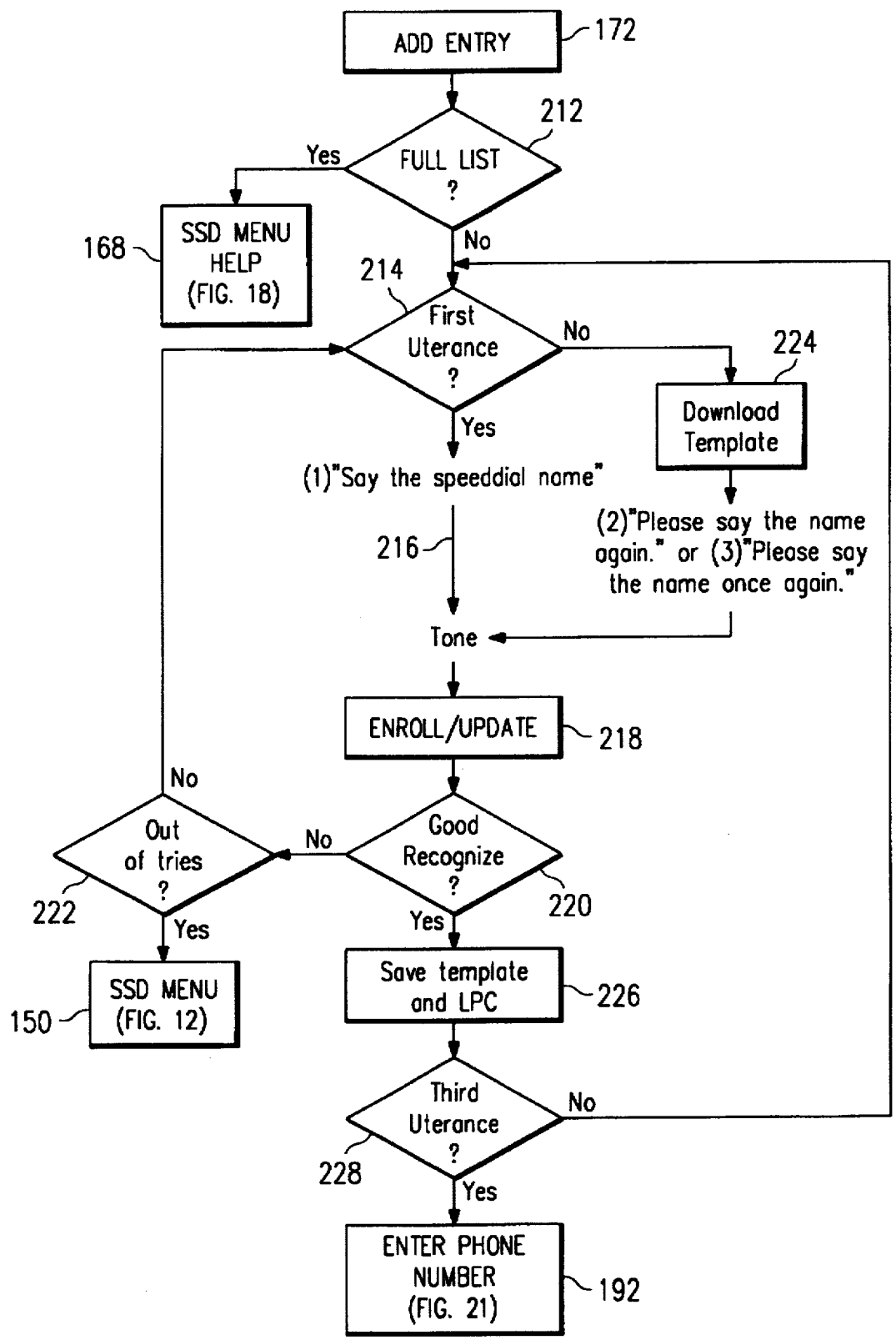
FIG. 20 illustrates a flow diagram for allowing the user to add an entry name to an entry list.

Returning to the speed dial menu option of FIG. 12, processor 14 may recognize an ADD ENTRY command or corresponding DTMF push button code at step 154k and enter add entry block 172. FIG. 20 is a flow diagram of add entry block 172. Upon entering add entry block 172, decision block 212 determines if the entry list is full. If so, process flow proceeds to speed dial menu help block 168 of FIG. 18 as previously described above. If the entry list is not full, process flow proceeds to decision block 214 to determine if this is a first utterance of an entry name. The add entry option requires three utterances of the entry name to obtain a valid template representing the entry name.

Assuming that this is the first utterance, processor 14 requests the user to say the speed dial entry name at step 216. Processor 14 enrolls the entry name at step 218 and compares the utterance to a previously obtained utterance at step 220. Since this is the first utterance, there is no previous utterance to compare it to, so process flow proceeds to decision block 222 which determines whether too many attempts have been made to enter an entry name. Since this is the first try, process flow returns to decision block 214 for a second utterance.

Since a second utterance is to be requested, decision block 214 routes process flow to block 224 to download the first template and request the user to repeat the entry name. The second utterance is enrolled in block 218 and compared to the first utterance at decision block 220. If a good match between the first and second utterance is not obtained, process flow proceeds to decision block 222 as previously described above. If the first utterance and the second utterance match, process flow proceeds to block 226 where a template is saved for the entry name.

Decision block 228 determines whether this has been the third utterance. If not, process flow returns to decision block 214 to repeat the process flow for a third utterance. Once a third utterance has been detected at decision block 228, process flow proceeds to enter phone number block 192. If processor 14 does not establish a match between utterances after three tries, process flow proceeds from decision block 222 to the speed dial menu option at block 150 of FIG. 12.

Figure 21:
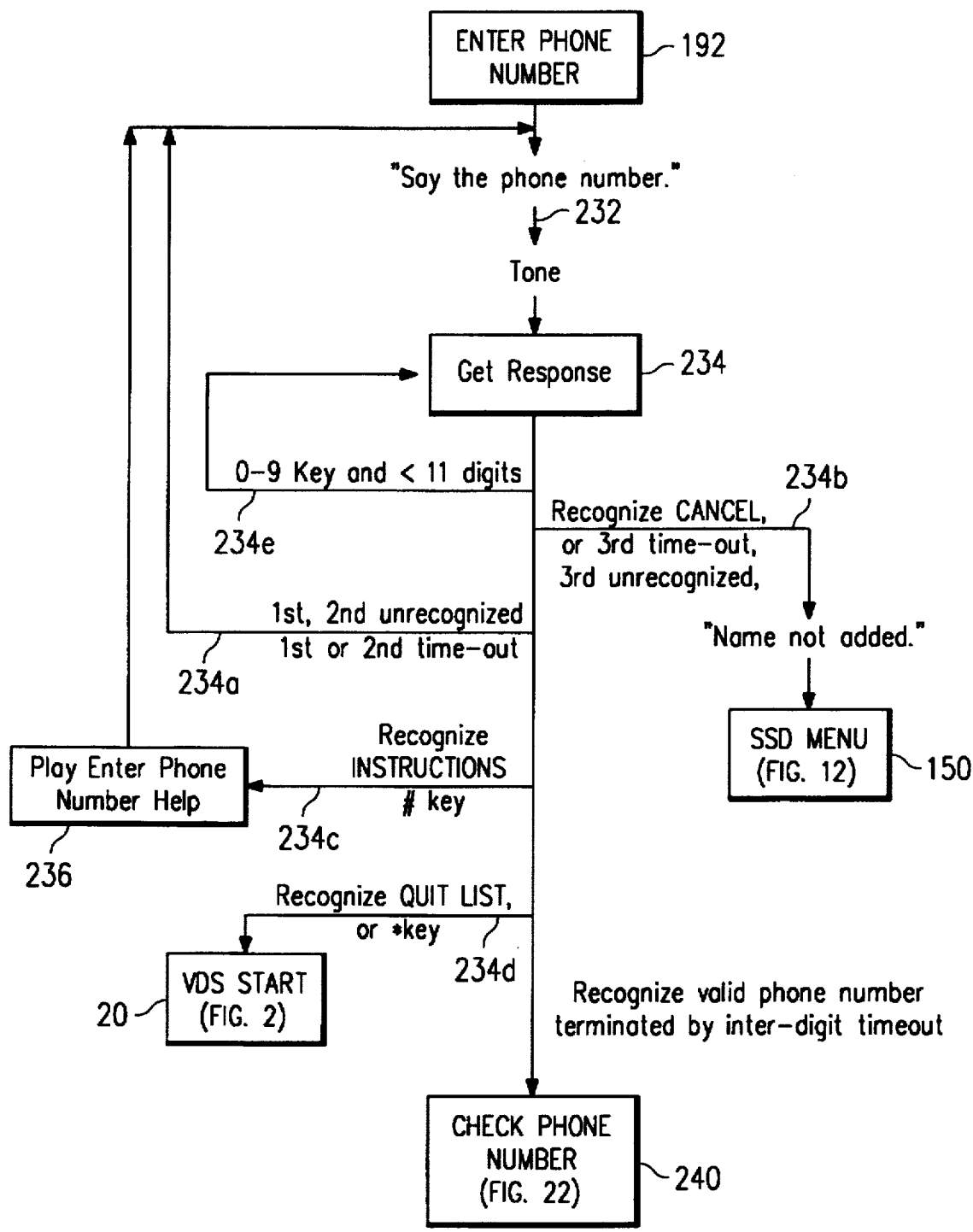
FIG. 21 illustrates a flow diagram for allowing the user to enter a phone number corresponding to the entry name added or selected.

FIG. 21 is a flow diagram of enter phone number block 192. Upon entering enter phone number block 192, processor 14 requests the user to say the phone number for the selected entry at step 232 and awaits the user's response at step 234. Processor 14 may receive a variety of phone number responses and proceed accordingly.

Processor 14 may receive an unrecognized response or no response at step 234a and return process flow to step 232 to request the user to say the desired phone number.

Processor 14 may recognize a CANCEL command or a third unrecognized response at step 234b and inform the user that the entry name is not added, returning process flow to the speed dial menu option at block 150 of FIG. 12.

Processor 14 may recognize an INSTRUCTIONS command or corresponding DTMF push button code at step 234c and play a message at step 236 informing the user how to proceed and enter a phone number, subsequently returning process flow to step 232 to request a response from the user.

Processor 14 may recognize a QUIT LIST command or corresponding DTMF push button code at step 234d, returning process flow to process start block 20 of FIG. 2.

Processor 14 may recognize spoken telephone numbers or telephone numbers input through the DTMF push button codes at step 234e. When a valid phone number is recognized, process flow proceeds to check phone number block 240.

Figure 22:
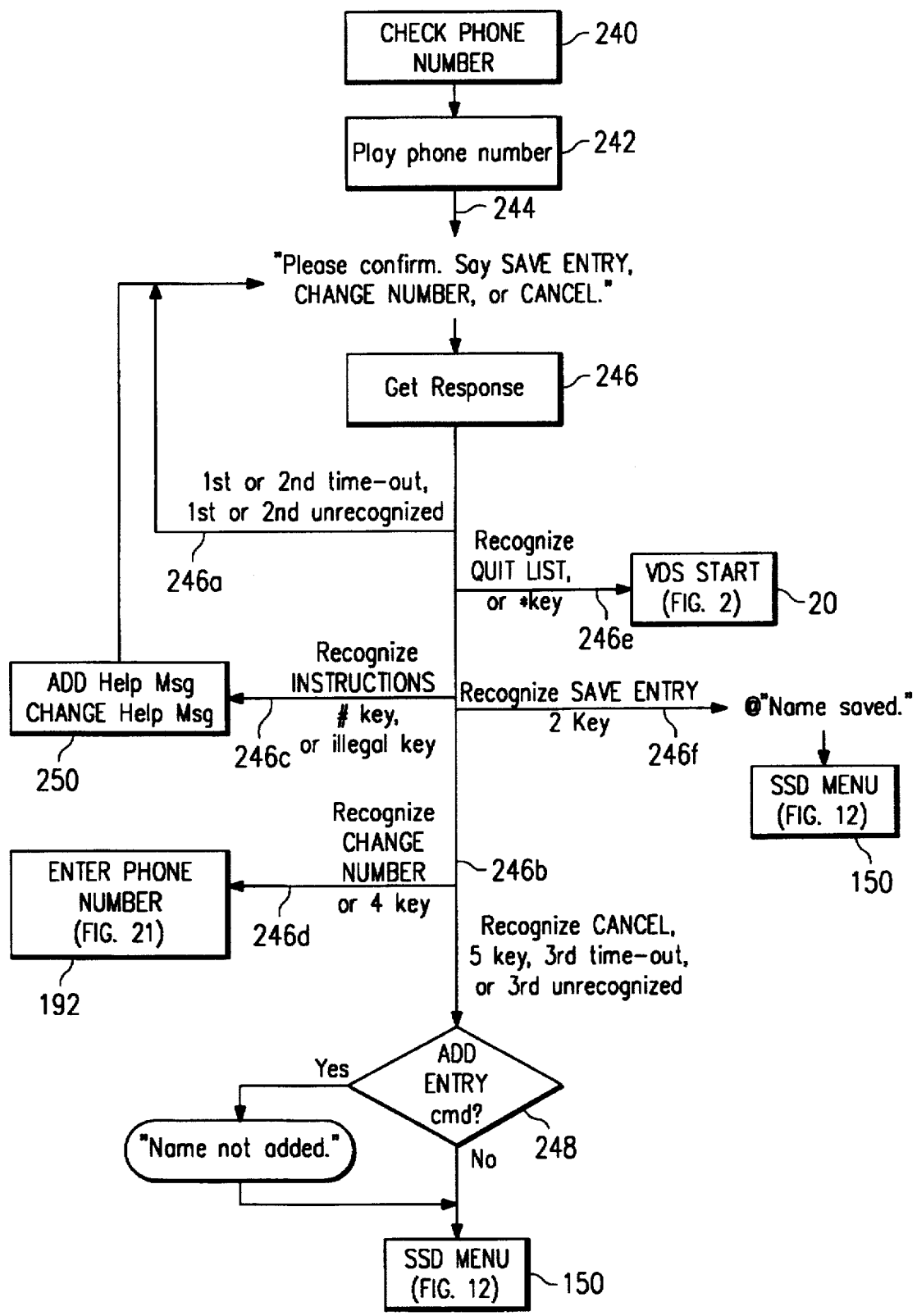
FIG. 22 illustrates a flow diagram for allowing the user to verify the phone number entered.

FIG. 22 is a flow diagram of check phone number block 240. Upon entering check phone number block 240, processor 14 will play the phone number at step 242 entered by the user from enter phone number block 192. Processor 14 will request the user to confirm the phone number at step 244 and await for a response at step 246. Processor 14 may receive a variety of check responses and proceed as follows.

Processor 14 may receive an unrecognized response or no response at step 246a and return process flow to step 244, requesting the user to provide an appropriate response.

Processor 14 may recognize a CANCEL command or corresponding DTMF push button code or a third unrecognized response or a third no response, at step 246b, and route process flow to decision block 248. If decision block 248 determines that this was part of an ADD ENTRY command, processor 14 informs the user that the entry name will not be added and returns process flow to the speed dial menu option at block 150 of FIG. 12.

Processor 14 may recognize an INSTRUCTIONS command or corresponding DTMF push button code or an illegal push button code at step 246c and inform the user at step 250 of how to proceed through check phone number block 240 and return process flow to step 244 to request a response from the user.

Processor 14 may recognize a CHANGE NUMBER command or corresponding DTMF push button code at step 246d and return process flow to enter phone number block 230 of FIG. 20.

Processor 14 may recognize a QUIT LIST command or corresponding DTMF push button code at step 246e, returning process flow to process start block 20 of FIG. 2.

Processor 14 may recognize a SAVE ENTRY command or corresponding DTMF push button code and inform the user that the entry name is saved with a valid phone number at step 246f and return process flow to the speed dial menu option at block 150 of FIG. 12.

In summary, a telephone system can be set up to generate user defined spoken speed dial directories. Each directory can contain an entry list having entry names and corresponding phone numbers, providing the user with a telephone directory in a voice recognition telephone system. The user can add and delete directories and entry names within a directory and change phone numbers accordingly. The user can establish a unique telephone listing through multiple directories and entry names and phone numbers within each directory.

Thus, it is apparent that there has been provided, in accordance with the present invention, a method for generating user defined spoken speed dial directories in a voice recognition telephone system that satisfies the advantages set forth above. Although the preferred embodiment has been described in detail, it should be understood that various changes, substitutions, and alterations can be made herein without departing from the spirit and scope of the present invention as defined by the following claims.

What is claimed is:

1. A method of generating user defined spoken speed dial directories, comprising the steps of:
    detecting an off-hook condition on a user's telephone system;
    recognizing speaker independent command words from a user in order to perform directory tasks;
    opening a directory list in response to one of the user's recognized speaker independent command words;
    enrolling a user defined directory name into said directory list, said directory name being subsequently modifiable by said user;
    opening an entry list in response to said user defined directory name being spoken by the user; and
    enrolling a plurality of speed dial entry names and phone numbers into said entry list such that said user has a unique telephone directory and wherein each of the plurality of speed dial entry names is associated with a corresponding one of said phone numbers.

2. The method of claim 1, further comprising the step of:
    dialing one of said phone numbers corresponding to one of said entry names in response to a request by said user.

3. The method of claim 1, further comprising the step of:
    removing one of the plurality of speed dial entry names and phone numbers from said entry list after enrolling the plurality of speed dial entry names and phone numbers into said entry list, thereby allowing said user to modify said entry list.

4. The method of claim 1, further comprising the step of:
    modifying the phone number of one of the plurality of speed dial entry names for a corresponding directory name after enrolling the plurality of speed dial entry names and phone numbers into said entry list, thereby allowing said user to modify said entry list.

5. The method of claim 1, further comprising the step of:
    communicating said directory list and entry list for a user defined directory name in response to a request from said user such that said user can review said unique telephone directory.

6. The method of claim 1, wherein said enrolling steps include creating templates corresponding to said user defined directory name, entry names, and phone numbers and storing said templates within a memory.

7. The method of claim 1, further comprising the step of:
    providing instructions to said user on how to proceed through said directory tasks upon a request from said user and in response to an improper command word from said user.

8. The method of claim 6, wherein said enrolling steps include;
    repeating the user defined directory name and one of the plurality of entry names; and
    comparing said repeated directory name and entry name to the template corresponding to the enrolled directory name and entry names in order to obtain a validated template of the user defined directory name and one of the plurality of entry names.

9. The method of claim 1, wherein said plurality of speed dial entry names are enrolled verbally by a user and said phone numbers are enrolled by pressing corresponding DTMF push buttons on said telephone system or by speaking said phone numbers into said telephone system.

10. The method of claim 1 further comprising the step of repeating the steps of enrolling a user defined directory name, opening an entry list and enrolling speed dial entry names and phone numbers, thereby enabling a plurality of user defined directory names to be generated.

11. A method of generating user defined spoken speed dial directories, comprising the steps of:
    detecting an off-hook condition on a user's telephone system;
    recognizing speaker independent command words from a user in order to perform directory tasks;
    opening a directory list in response to one of the user's recognized speaker independent command words;
    enrolling a user defined directory name into said directory list;
    opening an entry list in response to said user defined directory name being spoken by the user;
    enrolling a plurality of speed dial entry names and phone numbers into said entry list when spoken by the user such that said user has a unique telephone directory and wherein each speed dial entry name has a corresponding phone number; and
    removing said user defined directory name from said directory list after enrolling the user defined directory name into said directory list, thereby allowing said user to modify said directory list.

12. A method of generating spoken speed dial directories for a single user of a telephone system, comprising the steps of:

detecting an off hook condition on the telephone system;

monitoring the telephone system in response to said off hook condition for command words corresponding to tasks performed by the telephone system;

enrolling a user defined directory name in response to said user providing said command words and said directory name, said directory name being subsequently modifiable by said user; and enrolling a plurality of speed dial entry names and phone numbers for the directory name such that the user has a unique telephone directory stored within the telephone system.

13. The method of claim 12, further comprising the step of:

enrolling other directory names, entry names, and phone numbers upon request of the user.

14. The method of claim 12 further comprising the step of repeating the steps of enrolling a user defined directory name, speed dial entry names and phone numbers, thereby enabling a plurality of user defined directory names to be generated.

15. A method of generating spoken speed dial directories for a single user of a telephone system, comprising the steps of:

detecting an off hook condition on the telephone system;

monitoring the telephone system in response to said off hook condition for command words corresponding to tasks performed by the telephone system;

enrolling a user defined directory name in response to said user providing said command words and said directory name;

enrolling a plurality of speed dial entry names and phone numbers for the directory name such that the user has a unique telephone directory stored within the telephone system;

adding directory names, entry names, and phone numbers upon request of the user;

deleting other enrolled directory names, entry names, and phone numbers upon request of the user; and confirming deletion of the enrolled directory names, entry names, and phone numbers prior to actual deletion thereof.

16. The method of claim 15, further comprising the step of:

comparing the enrolled directory names and entry names to a requested directory name and entry name from the user in order to determine whether said requested directory name and entry name is within said user's telephone directory.

17. The method of claim 16, further comprising the step of:

automatically dialing a phone number corresponding to said requested directory name and entry name in response to said comparing step.

18. A device for generating user defined spoken speed dial directories, comprising:

circuitry for detecting an off hook condition on a telephone;

circuitry for monitoring said telephone for command words spoken by a user in response to said off hook condition such that said device is enabled to perform directory tasks associated with said command words;

circuitry for enrolling a plurality of user defined directory names in response to the spoken command words of the user in response to said user providing said command words and said directory names, said directory names being subsequently modifiable by said user;

circuitry for enrolling a plurality of speed dial entry names and phone numbers for each directory name such that the user has a unique telephone directory.

19. The device of claim 18, further comprising:

circuitry for modifying one of a plurality of phone numbers of one of the plurality of entry names within the telephone directory, said one of the plurality of phone numbers may be enrolled by pressing DTMF push buttons on said telephone system or by speaking said one of the plurality of phone numbers into said telephone.

20. A device for generating user defined spoken speed dial directories, comprising:

circuitry for detecting an off hook condition on a telephone;

circuitry for monitoring said telephone for command words spoken by a user in response to said off hook condition such that said device can perform directory tasks associated with said command words;

circuitry for enrolling a plurality of user defined directory names in response to said user providing said spoken command words and said directory names;

circuitry for enrolling a plurality of speed dial entry names and phone numbers for each directory name such that the user has a unique telephone directory;

circuitry for modifying one of a plurality of phone numbers of one of the plurality of entry names within the directory, said one of the plurality of phone numbers may be enrolled by pressing DTMF push buttons on said telephone or by speaking said one of the plurality of phone numbers into said telephone; and circuitry for removing one or all of the plurality of directory names, entry names, and phone numbers from said directory.

21. The device of claim 20, further comprising:

circuitry for comparing the plurality of directory names and entry names to a requested directory name and entry name from the user in order to determine whether said requested directory name and entry name is enrolled in said telephone directory.

22. The device of claim 21, further comprising:

circuitry for automatically dialing a phone number corresponding to said requested directory name and entry name in response to said comparing circuitry finding a match between the requested directory name and entry name enrolled in the device.

23. A method of generating user defined spoken speed dial directories, comprising the steps of:

detecting an off-hook condition on a user's telephone;

recognizing speaker independent command words from a user in order to perform directory tasks;

opening a directory list in response to one of the user's recognized speaker independent command words;

enrolling a directory name into said directory list in response to said user providing said command words and said directory name, said directory list being defined solely by said user and subsequently modifiable by said user;

opening an entry list in response to a directory name spoken by the user; and enrolling a plurality of speed dial entry names and phone numbers into said entry list when spoken by the user such that said user has a unique telephone directory and wherein each speed dial entry name has a corresponding phone number.

24. A method of generating spoken speed dial directories for a single user of a telephone system, comprising the steps of:

detecting an off hook condition on the telephone system;

monitoring the telephone system in response to said off hook condition for command words corresponding to tasks performed by the telephone system;

enrolling a user defined directory name in response to said user providing said command words and said directory name, said directory name being defined solely by said user and subsequently modifiable by said user; and enrolling a plurality of speed dial entry names and phone numbers for the directory name such that the user has a unique telephone directory stored within the telephone system.

* * * * *